(12) United States Patent
Johnson et al.

(10) Patent No.: US 12,326,912 B2
(45) Date of Patent: Jun. 10, 2025

(54) CACHING SYSTEM FOR PRESENTING DASHBOARD SNAPSHOTS WITH QUICK RESPONSE ACCESS TO LIVE DASHBOARD DATA

(71) Applicant: T-Mobile USA, Inc., Bellevue, WA (US)

(72) Inventors: Justin Johnson, Granite Falls, WA (US); Michael Mitchell, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 78 days.

(21) Appl. No.: 18/480,478

(22) Filed: Oct. 3, 2023

(65) Prior Publication Data
US 2025/0111002 A1 Apr. 3, 2025

(51) Int. Cl.
*G06F 15/16* (2006.01)
*G06F 16/955* (2019.01)
*G06F 16/957* (2019.01)
*G06K 19/06* (2006.01)

(52) U.S. Cl.
CPC ...... *G06F 16/9574* (2019.01); *G06F 16/9554* (2019.01); *G06K 19/06037* (2013.01)

(58) Field of Classification Search
CPC ............ G06F 16/9554; G06F 16/9574; G06K 19/06037
USPC ........................................................ 709/217
See application file for complete search history.

(56) References Cited

U.S. PATENT DOCUMENTS

| 7,490,295 | B2 | 2/2009 | Chaudhri et al. | |
|---|---|---|---|---|
| 7,933,955 | B2 | 4/2011 | Khalatian | |
| 8,165,993 | B2 | 4/2012 | Broda et al. | |
| 8,661,337 | B2 * | 2/2014 | Decker | G06F 40/14 |
| | | | | 715/234 |
| 9,383,900 | B2 | 7/2016 | Flores et al. | |
| 9,576,070 | B2 * | 2/2017 | Steiner | G06F 16/9574 |
| 9,762,460 | B2 | 9/2017 | Pawlowski et al. | |
| 10,250,656 | B2 | 4/2019 | Vishwanath et al. | |
| 10,296,653 | B2 * | 5/2019 | Shemesh | G06F 16/9574 |
| 10,387,521 | B2 * | 8/2019 | Steiner | H04L 67/02 |
| 10,409,367 | B2 | 9/2019 | Velez-rojas et al. | |

(Continued)

FOREIGN PATENT DOCUMENTS

| CN | 101087406 A | 12/2007 |
|---|---|---|
| CN | 111767486 A | 10/2020 |

(Continued)

*Primary Examiner* — Moustafa M Meky
(74) *Attorney, Agent, or Firm* — Perkins Coie LLP

(57) ABSTRACT

The disclosed technology includes a system that optimizes computing resources for dashboards. The system includes a computing device and memory that caches snapshots of dashboard outputs. A dashboard output captures a snapshot (e.g., instance in time) of dashboard data that can be presented on display devices without needing to maintain continuous access to the underlying dashboard data. The snapshot has a quick response (QR) code overlayed at a position for a viewer to capture the QR code with a camera on a smartphone. The smartphone can read the QR code to access dashboard data through a backend communications link. The QR code can embed data that is used to track and store information about what data is being accessed by users and the frequency with which the data is being accessed.

20 Claims, 6 Drawing Sheets

(56) References Cited

U.S. PATENT DOCUMENTS

| | | |
|---|---|---|
| 10,452,234 B2 | 10/2019 | Kammath et al. |
| 10,515,329 B2 | 12/2019 | Enyeart et al. |
| 10,614,404 B2 | 4/2020 | Guo et al. |
| 10,754,893 B1 | 8/2020 | Isler et al. |
| 10,931,685 B2 | 2/2021 | Smith |
| 10,936,795 B2 * | 3/2021 | Decker ................ G06F 40/143 |
| 11,016,728 B2 | 5/2021 | Flores et al. |
| 11,037,217 B2 | 6/2021 | Brown |
| 11,048,760 B1 | 6/2021 | Bhushan et al. |
| 11,113,491 B2 | 9/2021 | Whelan et al. |
| 11,150,850 B1 | 10/2021 | Caño et al. |
| 11,199,951 B1 | 12/2021 | Wittke et al. |
| 11,232,159 B1 * | 1/2022 | Mathews ............ G06F 16/9035 |
| 11,281,776 B2 | 3/2022 | Todasco et al. |
| 11,386,417 B2 | 7/2022 | Sinha et al. |
| 11,418,473 B2 * | 8/2022 | Thom .................. H04L 51/212 |
| 11,520,799 B2 | 12/2022 | Hollander et al. |
| 11,544,344 B2 * | 1/2023 | Chu ..................... G06F 16/972 |
| 11,593,132 B1 | 2/2023 | Rane et al. |
| 11,645,709 B2 | 5/2023 | Probetts et al. |
| 11,687,910 B2 | 6/2023 | Kang et al. |
| 11,714,782 B2 | 8/2023 | Subramanian et al. |
| 11,794,108 B2 * | 10/2023 | Benedetto ................ A63F 13/49 |
| 2004/0225955 A1 | 11/2004 | Ly |
| 2008/0091488 A1 | 4/2008 | Hempstead |
| 2012/0066586 A1 * | 3/2012 | Shemesh ............ G06F 16/9574 |
| | | 709/217 |
| 2012/0089471 A1 | 4/2012 | Comparelli |
| 2012/0197916 A1 | 8/2012 | Tobin et al. |
| 2012/0199647 A1 | 8/2012 | Hwang et al. |
| 2012/0311429 A1 * | 12/2012 | Decker ................ G06F 40/143 |
| | | 715/234 |
| 2013/0038733 A1 | 2/2013 | Palmer et al. |
| 2014/0123000 A1 * | 5/2014 | Decker ................ G06F 40/143 |
| | | 715/234 |
| 2014/0172744 A1 | 6/2014 | El-hmayssi et al. |
| 2015/0310126 A1 * | 10/2015 | Steiner ................ G06F 16/9574 |
| | | 715/204 |
| 2015/0379529 A1 | 12/2015 | Batrakov |
| 2017/0116349 A1 * | 4/2017 | Steiner ................ G06F 16/9566 |
| 2017/0193182 A1 | 7/2017 | Mihai |
| 2017/0264608 A1 | 9/2017 | Moore et al. |
| 2020/0005555 A1 | 1/2020 | Fiello |
| 2020/0027046 A1 | 1/2020 | Woods et al. |
| 2020/0159866 A1 * | 5/2020 | Dong ..................... G06F 16/958 |
| 2020/0210378 A1 | 7/2020 | Kuchibhotla et al. |
| 2021/0133274 A1 * | 5/2021 | Chu ..................... G06F 16/9577 |
| 2021/0258165 A1 | 8/2021 | Woo |
| 2022/0147199 A1 * | 5/2022 | Mathews ............ G06F 16/9574 |
| 2022/0147966 A1 | 5/2022 | Babcock et al. |
| 2022/0147970 A1 | 5/2022 | Babcock et al. |
| 2022/0398306 A1 | 12/2022 | Misra et al. |
| 2023/0027204 A1 | 1/2023 | Abdel-radi et al. |
| 2024/0054174 A1 * | 2/2024 | Idema .................. G06F 11/323 |

FOREIGN PATENT DOCUMENTS

| | | |
|---|---|---|
| CN | 112005316 A | 11/2020 |
| CN | 109146787 B | 9/2022 |
| DE | 102020100734 A1 | 7/2020 |
| EP | 1099165 A1 | 5/2001 |
| EP | 2705664 A2 | 3/2014 |
| EP | 2862051 A2 | 4/2015 |
| EP | 3531361 A1 | 8/2019 |
| EP | 2785050 B1 | 12/2019 |
| EP | 3709606 A1 | 9/2020 |
| EP | 3729215 A1 | 10/2020 |
| EP | 3885734 A1 | 9/2021 |
| EP | 3298771 B1 | 12/2021 |
| EP | 3230919 B1 | 4/2023 |
| EP | 3869339 B1 | 5/2023 |
| EP | 3374857 B1 | 6/2023 |
| EP | 3665894 B1 | 7/2023 |
| JP | 2006099406 A | 4/2006 |
| JP | 2007317186 A | 12/2007 |
| JP | 2008033912 A | 2/2008 |
| JP | 2019515564 A | 6/2019 |
| JP | 7041168 B2 | 3/2022 |
| JP | 2022092604 A | 6/2022 |
| KR | 100330501 B1 | 4/2002 |
| KR | 100892072 B1 | 4/2009 |
| KR | 101244357 B1 | 3/2013 |
| KR | 101706137 B1 | 2/2017 |
| KR | 102024520 B1 | 9/2019 |
| KR | 102053945 B1 | 12/2019 |
| KR | 102297575 B1 | 9/2021 |
| KR | 102353310 B1 | 1/2022 |
| KR | 102416892 B1 | 7/2022 |
| KR | 20220092614 A | 7/2022 |
| WO | 2011143065 A1 | 11/2011 |
| WO | 2012112822 A2 | 8/2012 |
| WO | 2013160934 A1 | 10/2013 |
| WO | 2015079428 A1 | 6/2015 |
| WO | 2017096401 A1 | 6/2017 |
| WO | 2019173298 A1 | 9/2019 |
| WO | 2020130795 A2 | 6/2020 |
| WO | 2020146716 A1 | 7/2020 |
| WO | 2021174169 A1 | 9/2021 |
| WO | 2021248143 A2 | 12/2021 |
| WO | 2022152391 A1 | 7/2022 |
| WO | 2022155248 A1 | 7/2022 |

* cited by examiner

CACHING SYSTEM FOR PRESENTING DASHBOARD SNAPSHOTS WITH QUICK RESPONSE ACCESS TO LIVE DASHBOARD DATA

BACKGROUND

In business computer information systems, a dashboard is a type of graphical user interface which often provides at-a-glance views of key performance indicators (KPIs) relevant to a particular objective or business process. In other usage, "dashboard" is another name for "progress report" or "report" and considered a form of data visualization. In providing this overview, business owners can save time and improve their decision making by utilizing dashboards.

BRIEF DESCRIPTION OF THE DRAWINGS

Detailed descriptions of implementations of the present invention will be described and explained through the use of the accompanying drawings.

Figure 1:
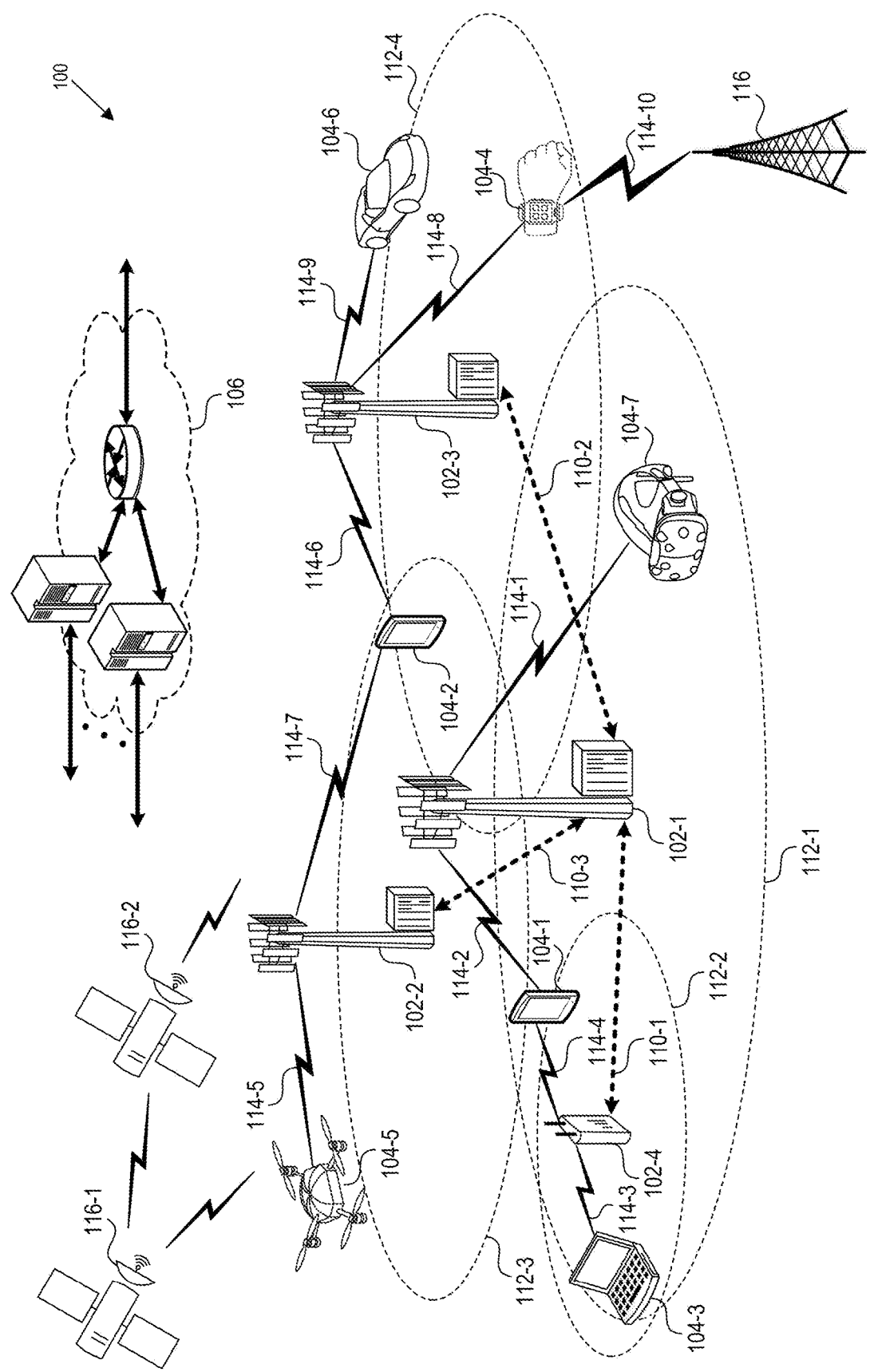
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology includes a system that optimizes computing resources for dashboards. The system includes a computing device and memory that caches snapshots of dashboard outputs. The dashboard outputs are displayed as static snapshots on display devices for users to view. For example, the dashboard outputs can include sales metrics of companies that are shared with all their employees. The data needed for the dashboard outputs can come from multiple data sources. A dashboard output thus captures a snapshot (e.g., instance in time) of dashboard data that can be presented on display devices without needing to maintain continuous access to the underlying dashboard data.

The snapshot has a quick response (QR) code overlayed at a position for a viewer to capture the QR code with an imaging device, such as a camera on a handheld mobile device (e.g., smartphone). The smartphone can read the QR code to access the underlying dashboard data through a backend communications link. That is, the QR code provides a link to a remote dashboard. The QR code can embed data that is used to track and store information about what data is being accessed by users and the frequency that the data is being accessed. For example, different snapshots of dashboard data can include different QR codes with identifiers that distinguish the different snapshots from each other. As such, the particular snapshots and frequency that they are captured can be collected to determine, for example, which metrics or features users interact with the most. Based on the rate of utilization, the system can determine to update the frequency for capturing snapshots of the metrics or features more frequently.

By utilizing static snapshots, the system can also automate updating the remote dashboard because the system does not require the remote dashboard to be connected to multiple data sources for up-to-date data at all times. For example, current remote dashboards require a high amount of computing resources due to the number of users, refresh rates, and displaying time-accurate data. For instance, for every refresh and for every new user accessing the dashboard, current systems require additional central processing unit (CPU) load for these requests.

Instead of manually or continuously updating the dashboard presented to viewers, the system employs a web server to capture and update static snapshots of the dashboard to present to viewers. The system can administer web browser tool that can execute commands, render web pages including the dashboard data with QR codes, and interact with websites easily. The user is able to script commands using the tool's application programming interface (API) to automate the process of creating static snapshots of dashboards. Moreover, the system can determine which static snapshots are required to be updated more frequently based on the interactions tracked by the QR code. For example, the QR code can store and track which metrics or features of the dashboard users interact with the most. For instance, the QR code utilization can indicate that users interact with a feature showing sales data the most. In response, the user can update the API to update the static snapshot from the sales database more frequently.

This technology thus improves the adaptability and responsibility of the system. For example, by using static snapshots, the system requires fewer computer resources such as less server utilization, less CPU load, and less memory storage. This also allows for seamless adjustments and across multiple dashboards regardless of their location.

By using the disclosed technology, businesses can share internal data with employees in public areas easily. Currently, businesses are not able to share internal data due to security concerns. For example, as refresh rates and the number of users utilizing the remote dashboard increase, the system requires robust authentication mechanisms. By using static snapshots, the system reduces computational demand on servers; therefore, allowing the business to utilize basic authentication methods for accessing the remote dashboard. Thus, more users are able to access and use the dashboard data without access the dashboards.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

Caching System

Figure 2:
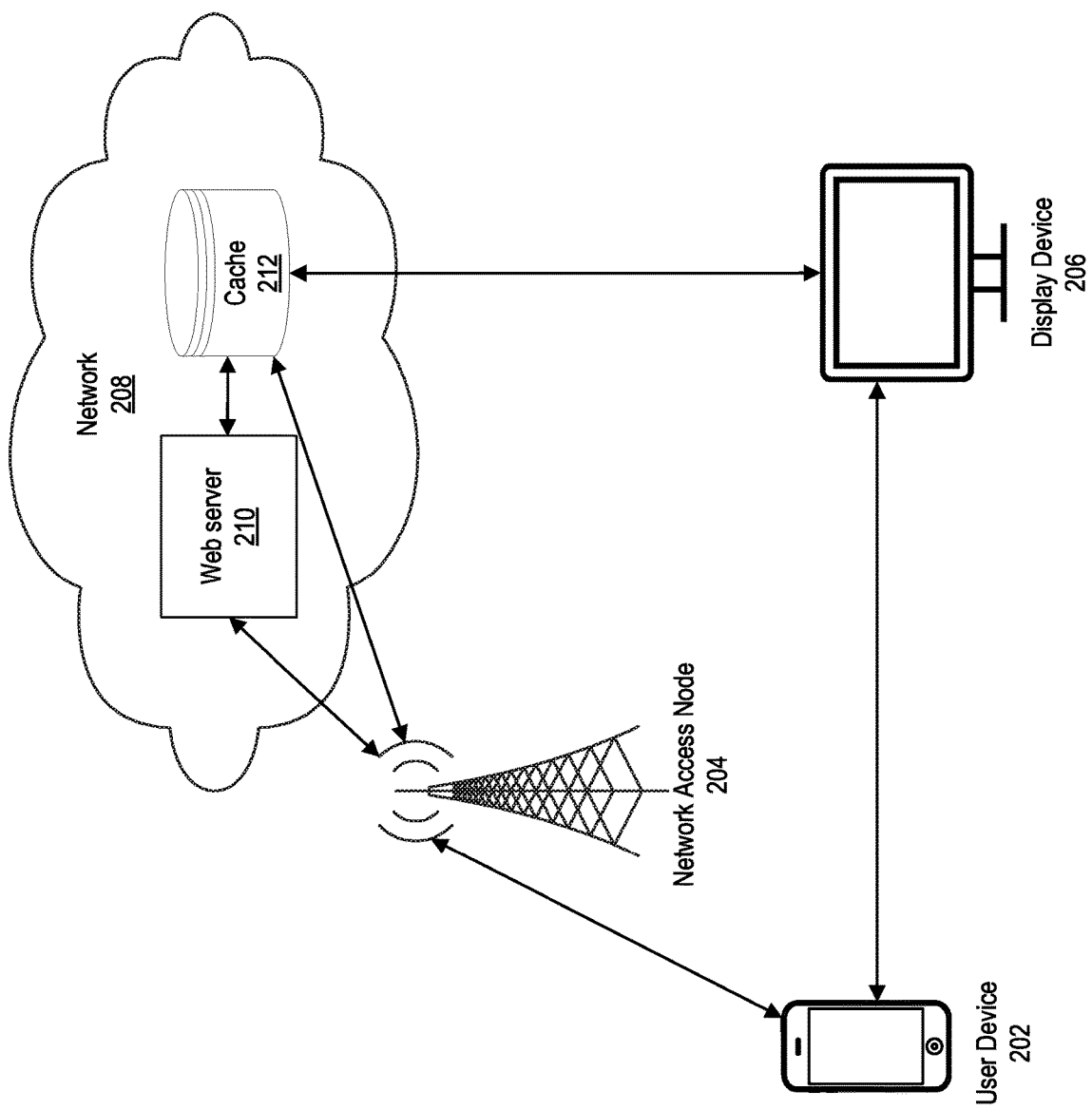
FIG. 2 is a block diagram that illustrates a caching system for sharing data between users.

FIG. 2 illustrates a caching system 200 including a web server 210 configured to enable access to the different snapshot images of a dashboard for display via an internet browser on the display device. The web server 210 includes processing components, software, and other components configured to connect and exchange data with other devices and systems over the internet or other communications networks. As such, the web server 210 can connect to a handheld user device 202, a display device 206, network 208, and a cache memory device 212 through the network access node 204. As such, the user can access different snapshot images of a dashboard via a display device.

A dashboard is a software program designed to visualize data. The dashboard software works with integrations with different systems in order to take key metrics data and display it on the dashboard. For example, the dashboard for a telecommunications provider can show metrics such as new customer accounts each month, monthly store visits, and expected profit. The web server 210 can capture a snapshot image of a dashboard including one or more visualizations. The dashboard is configured to generate the one or more visualizations in real time based on metric data obtained from one or more data sources. For example, the web server can capture a snapshot image of the dashboard showing the following metrics: new customer accounts each month, monthly store visits, and expected profit per month. Dashboards require access to multiple data sources for up-to-date data at all times. Therefore, current dashboards require a high amount of computing resources due to the number of users, refresh rates, and the need to display time-accurate data. For instance, for every refresh and for every new user accessing the dashboard, current systems require additional CPU load for these requests. However, by capturing a snapshot image of the dashboard, the web server can reduce the amount of computer resources needed to manage the dashboard. For instance, after capturing the snapshot image, the web server 210 can store the snapshot image of the dashboard at a cache memory device. The cache memory device stores multiple snapshot images of the dashboard captured at different points in time. By only storing the snapshot images for display on the display device 206 and not having to refresh to receive up-to-date data all the time, the system can utilize less memory storage overall.

The web server 210 can cause a display of the snapshot image of the dashboard and an accompanying QR code. For example, after capturing and storing the snapshot image, the web server 210 sends a command to the display device 206 to display the snapshot image and an accompanying QR code which allows the handheld user device 202 to scan the QR code to establish a live connection to the dashboard via links embedded in the different QR codes as shown in FIGS. 3A-B.

Figure 3A:
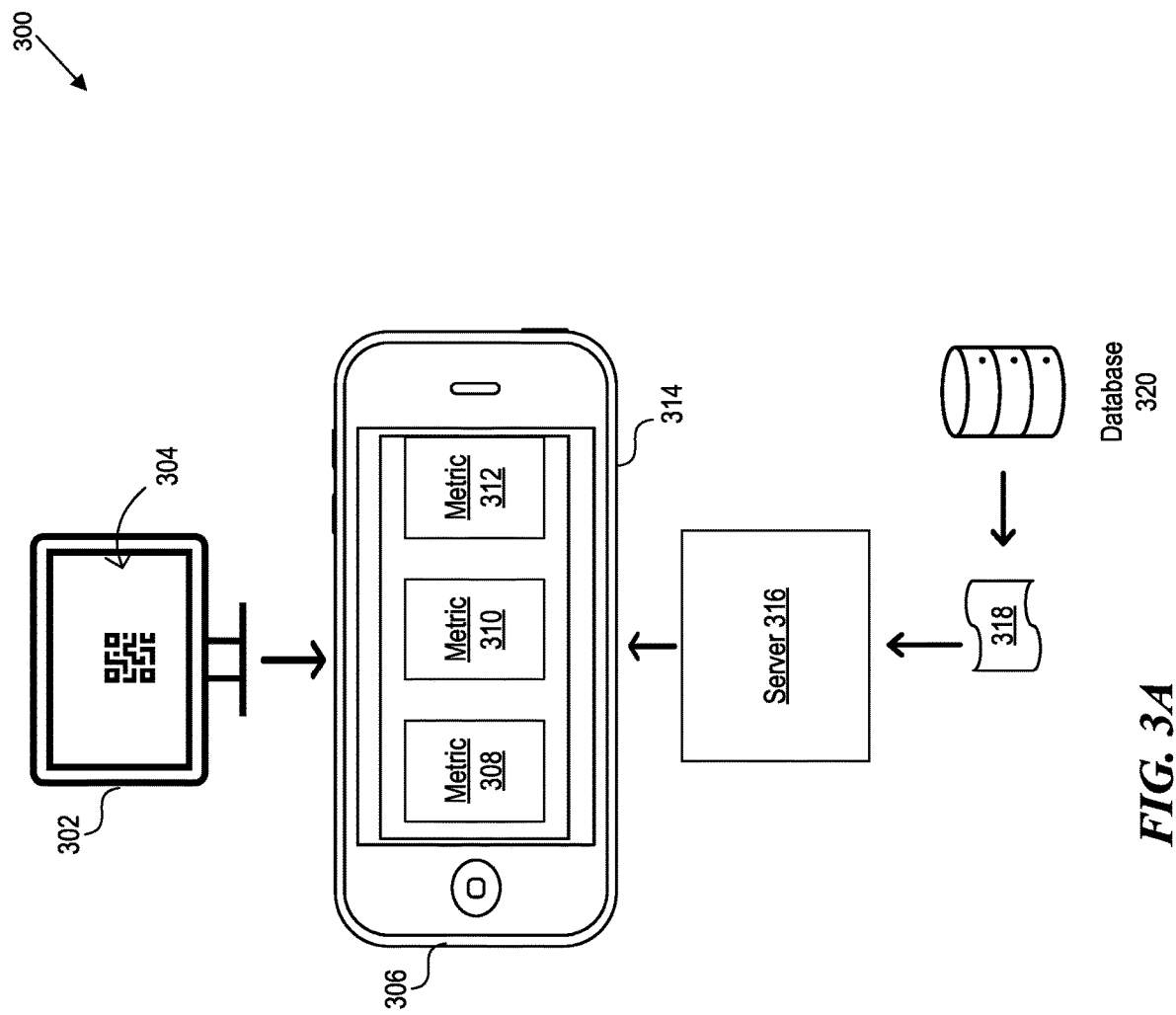
FIG. 3A is a block diagram that illustrates a system for using one quick response (QR) code to automate access to live dashboards by using the visualized technology.
Figure 3B:
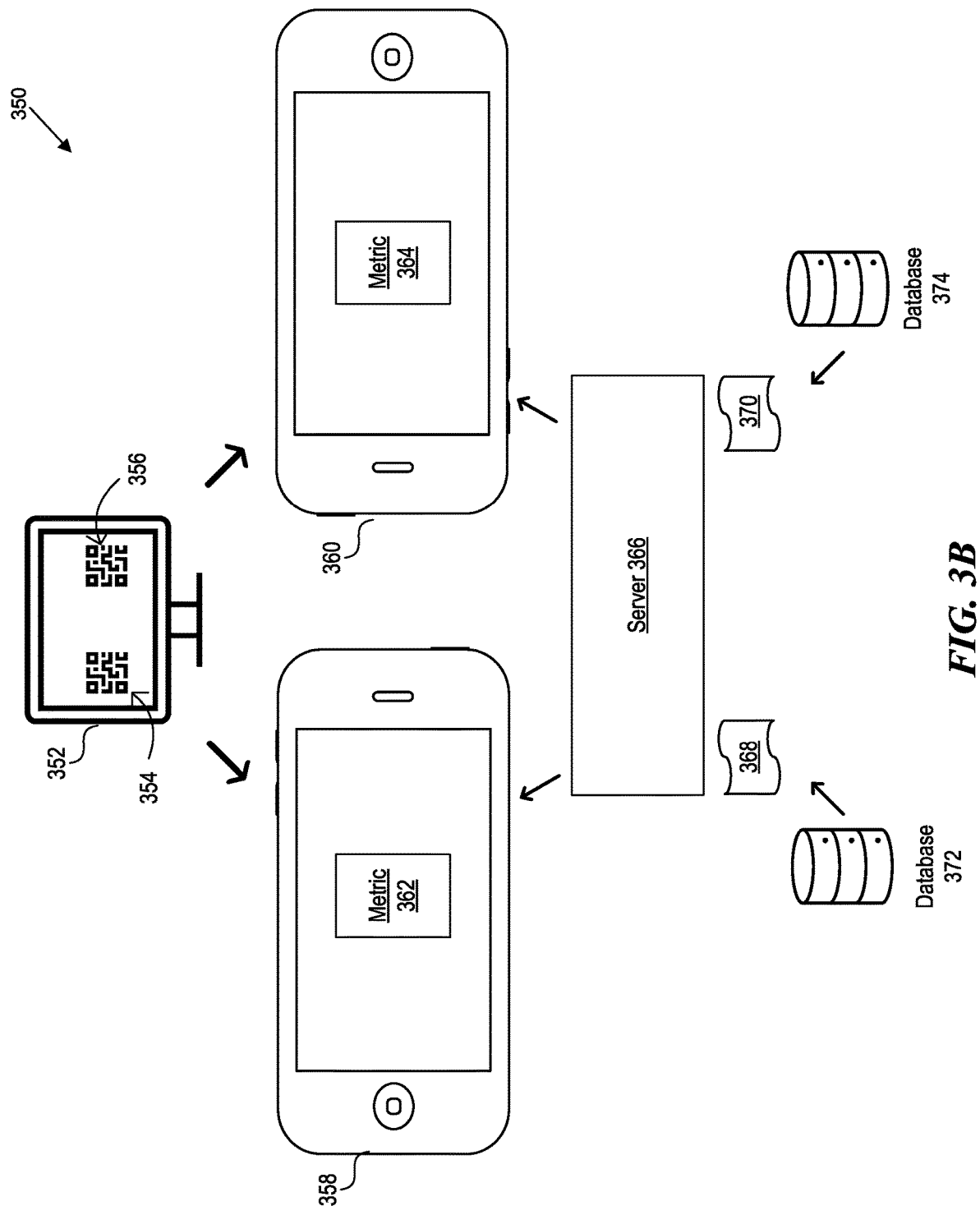
FIG. 3B is a block diagram that illustrates a system for using multiple QR codes to automate access to live dashboards by using the visualized technology.

FIGS. 3A-B are block diagrams that illustrate a system for using static snapshots to automate access to live dashboards. FIG. 3A illustrates a system 300 including a display device 302, QR code 304, handheld user device 306, metric 308, metric 310, metric 312, dashboard 314, server 316, data 318, and database 320. The handheld user device 306 is configured to present dashboard snapshots with QR codes to access live dashboard data. The handheld user device 202 is operable to scan a QR code to allow the user device to present dashboard snapshots. The handheld user device 306 includes a QR reader. QR codes include data in a series of dots in a square grid. Each dot represents a one and each blank represents a zero in binary code, and the patterns encode sets of numbers, letters, or both, including URLs. By orienting the QR code, the QR reader in the handheld user device 306 can decipher the QR code. In some embodiments, the system can determine a location on the image of the snapshot to overlay the QR code based on the one or more visualizations. For example, the QR code can be located in an empty space in the snapshot image where no metrics are being shown.

After deciphering the QR code, the handheld user device 306 can trigger an action after the system validates the QR code. For example, since each accompanying QR code includes a unique identifier for the snapshot image, when a handheld user device 306 scans the QR code it will launch the URL embedded within the QR code for that particular snapshot image and the metrics captured within it after validating the particular QR code. When validating the QR code and establishing a link to the dashboard, the system can authenticate the particular user device being used to do so as well as the user associated with the device. For example, before allowing someone access to a company's dashboard, the system can authenticate the user as an employee of the company before loading the URL by requesting user information and matching it to an approved users list.

Once users have access to the live dashboards, the system can start collecting user activity data to determine user insights. For instance, the web server 210 can aggregate data indicating patterns of utilization of different QR codes of different snapshot images. For example, as shown in system 350 of FIG. 3B, a display device 352 can display two different QR codes-QR code 354 and QR code 356. This allows the user to decide which QR code they want to scan, where each QR code corresponds to a different metric on the dashboard. For example, the user associated with user device 358 scans QR code 354 to display metric 362. In response, server 366 receives the data 368 required for the metric from database 372. Another user can utilize user device 360 to scan QR code 356 to display metric 364. In response, server 366 receives the data 370 required for the metric from database 374. For example, the web server 210 can track the number of users who scan QR code 354 versus the number of users who scan QR code 356. Based on that data, the system can generate a schedule based on the aggregate data to capture snapshot images of the dashboard at particular points in time. For example, if the system determines users scan QR code 354 more often, the system can generate a schedule to update the snapshot image associated with QR code 354 more often than the snapshot image associated with QR code 356. The system can analyze the user activity data to generate an interest factor. The interest factor includes a metric of interest for the particular snapshot image. Then, based on the metric of interest, the system can change the threshold time to update the particular snapshot image. For example, the system can decrease the threshold time for updating the particular snapshot image so that the snapshot image updates more frequently based on the interest factor from users.

In another implementation, the system can analyze the user activity data to generate a rate over time including a measure for a change in values over a time period and where the rate over time is set as a value threshold. For example, the system can track how often users look at a particular snapshot image. The system can generate a rate over time as five views every day. In response to detecting a new rate over time, such as ten views every day, the system can be notified to capture a new snapshot image more frequently.

In another implementation, the system can generate a schedule to capture snapshot images of the dashboard at particular points in time. In one example, the system can schedule one or more predetermined time periods for capturing the snapshot images. For instance, the system can schedule a time period such as every Monday to update the snapshot images. In another example, the system can schedule one or more predetermined times of day for capturing the snapshot images. For instance, the system can schedule a time of day such as every day at 10 a.m. to update the snapshot images.

In another implementation, the system can input the user activity data to a machine learning model configured to estimate when to capture future snapshot images. A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the machine learning model can be a neural network with multiple input nodes that receive data inputs such as user activity data. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer ("the output layer"), one or more nodes can produce a value classifying the input that, once the model is trained, can be used to determine a schedule. In some implementations, such neural networks, known as deep neural networks, can have multiple layers of intermediate nodes with different configurations, can be a combination of models that receive different parts of the input and/or input from other parts of the deep neural network, or are convolutions-partially using output from previous iterations of applying the model as further input to produce results for the current input. In some embodiments, the machine learning model can be trained with supervised learning, where the training data includes user activity data as input and a desired output, such as when to capture future snapshot images. Finally, after generating a schedule, the system can automatically capture snapshot images of the dashboard in accordance with the schedule. Automating the process of capturing snapshot images saves time, reduces errors, and increases efficiency for the system.

In one embodiment, to ensure there are no errors and to increase efficiency, the system can check the timestamp of each snapshot image to ensure that it is from the correct time period. In response to determining that the timestamp of the snapshot image does not match the timeframe the system is expecting, the system can display an error message on the display device. In another embodiment, the system can check the size of the snapshot image to determine how often to update the snapshot image. For example, if the snapshot image is large, then the system can determine to update it less frequently to utilize fewer computing resources.

Figure 4:
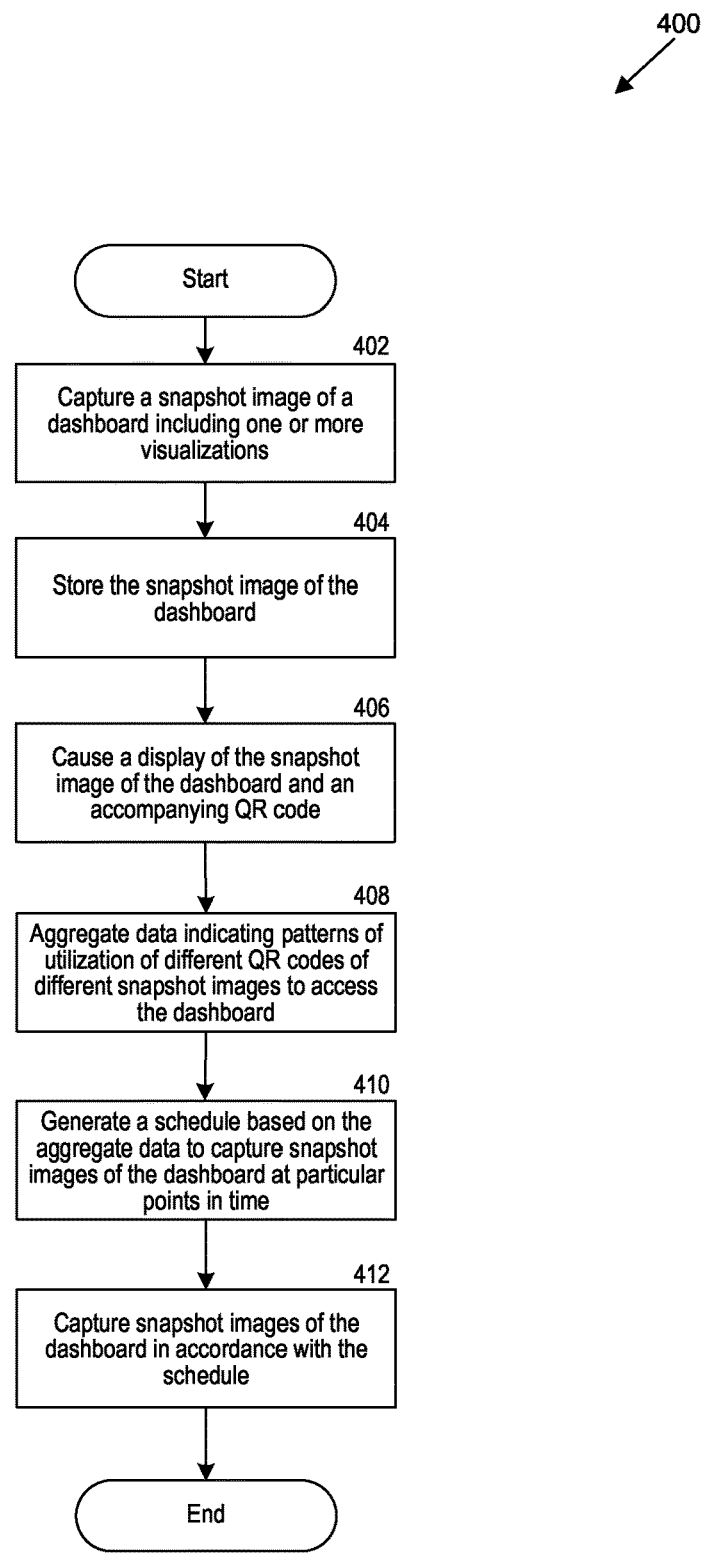
FIG. 4 is a flowchart that illustrates a method for presenting dashboard snapshots with QR codes to access live dashboard data.

FIG. 4 is a flowchart that illustrates a method performed by a system that is configured to present dashboard snapshots with QR codes to access live dashboard data. The method 400 can be performed by the system including, for example, a handheld mobile device (e.g., smartphone) and/or a server coupled to the handheld mobile device over a communications network (e.g., a telecommunications network). The handheld mobile device and/or server includes at least one hardware processor and at least one non-transitory memory storing instructions that, when executed by the at least one hardware processor, cause the system to perform the method 400.

At 402, the system can capture a snapshot image of a dashboard including one or more visualizations. In one example, a web server can capture a snapshot image of the dashboard using a software agent controlled by an API. For instance, the API can cause the software agent to launch a browser to open a new page to navigate to the URL of the dashboard. The agent can then capture a screenshot of the page displaying the dashboard by manipulating a document object model to capture a webpage static snapshot. The dashboard can include one or more visualizations such as charts, graphs, or tables. By capturing the page displaying the dashboard, the system can also capture one or more visualizations that the dashboard is displaying at the time of capturing the snapshot image. This allows the system to automate a user's access to live dashboards.

At 404, the system can store the snapshot image of the dashboard. In one example, the web server can store the snapshot image of the dashboard to a cache memory device. For instance, the API can cause the software agent to save the screenshot of the dashboard to memory. After storing the snapshot image, the system can generate an accompanying QR code. The accompanying QR code includes a unique identifier for the snapshot image. After generating the QR code, the system can determine a location on the image of the snapshot to overlay the QR code based on the one or more visualizations. The location includes a point on or outside of the image of the snapshot. For example, the system can determine where in the image of the snapshot there are no visualizations such as charts or graphs displayed and overlay the QR code in that location. This allows users to view the visualizations while having the capability to scan the QR code to access the dashboard URL.

At 406, the system can cause a display of the snapshot image of the dashboard. In one example, the web server can be connected to a telecommunications network. Therefore, the web server can transmit instructions to the display device to display the snapshot image of the dashboard and the accompanying QR code. The web server can also enable access to the different snapshot images of the dashboard for display via an internet browser on the display device. After enabling access to display the snapshot image and the accompanying QR code, the web server can enable a live connection to the dashboard for the handheld mobile device after the handheld mobile device scans the links embedded in the different QR codes. In one implementation, the web server can validate the user's access to the live connection. For instance, before allowing a user access to a dashboard, the system can authenticate the user before loading the URL by requesting user information and matching it to an approved users list. By doing so, the system can share the dashboard with users while ensuring the dashboard remains secure.

At 408, the system can aggregate data indicating patterns of utilization of different QR codes of different snapshot images to access the dashboard. In one example, the web server can receive and collect user activity data from multiple user devices. The user activity data includes the rate of utilization of different QR codes. For instance, the web server can track the number of users who view a monthly profit metric versus the number of users who view a monthly store visit metric. The system can do so by tracking user interactions with the dashboards by monitoring page views, clicks, and other engagement metrics. By doing so, the system can determine which metrics on the dashboard are utilized most often by users.

At 410, the system can generate a schedule based on the aggregate data to capture snapshot images of the dashboard at particular points in time. In one example, the system can generate a schedule to capture snapshot images of the dashboard at particular points in time. For instance, the system can schedule one or more predetermined time periods such as a time period of every Monday 9 am to 5 pm for capturing the snapshot images. In another instance, the system can schedule one or more predetermined times of day for capturing the snapshot images. For example, the system can schedule a time of day such as every day at 10 a.m. to update the snapshot images. In another example, the web server can generate the schedule based on the user utilization rate on a particular QR code. The system can analyze the user utilization rate to generate an interest factor. The interest factor includes a metric of interest for the particular QR code corresponding to a particular snapshot image. Based on the metric of interest, the system can change a threshold time to update the particular snapshot image. For instance, the system can decrease the threshold time for updating the particular snapshot image so that the snapshot image updates more frequently based on the interest factor from users. In a final example, the system can input the user activity data to a machine learning model configured to estimate when to capture future snapshot images.

At 412, the system can capture snapshot images of the dashboard in accordance with the schedule. In one example, the web server can update the existing API to cause the agent to capture snapshot images of the dashboard in accordance with the schedule. For instance, the user can determine a schedule to update the snapshot images of the dashboard every day at 4 µm. The user can use the web server's built-in task scheduler to cause the agent to capture a new screenshot of the dashboard every day at 4 pm. By continuously updating the snapshot images, the users can have access to up-to-date data.

Computer System

Figure 5:
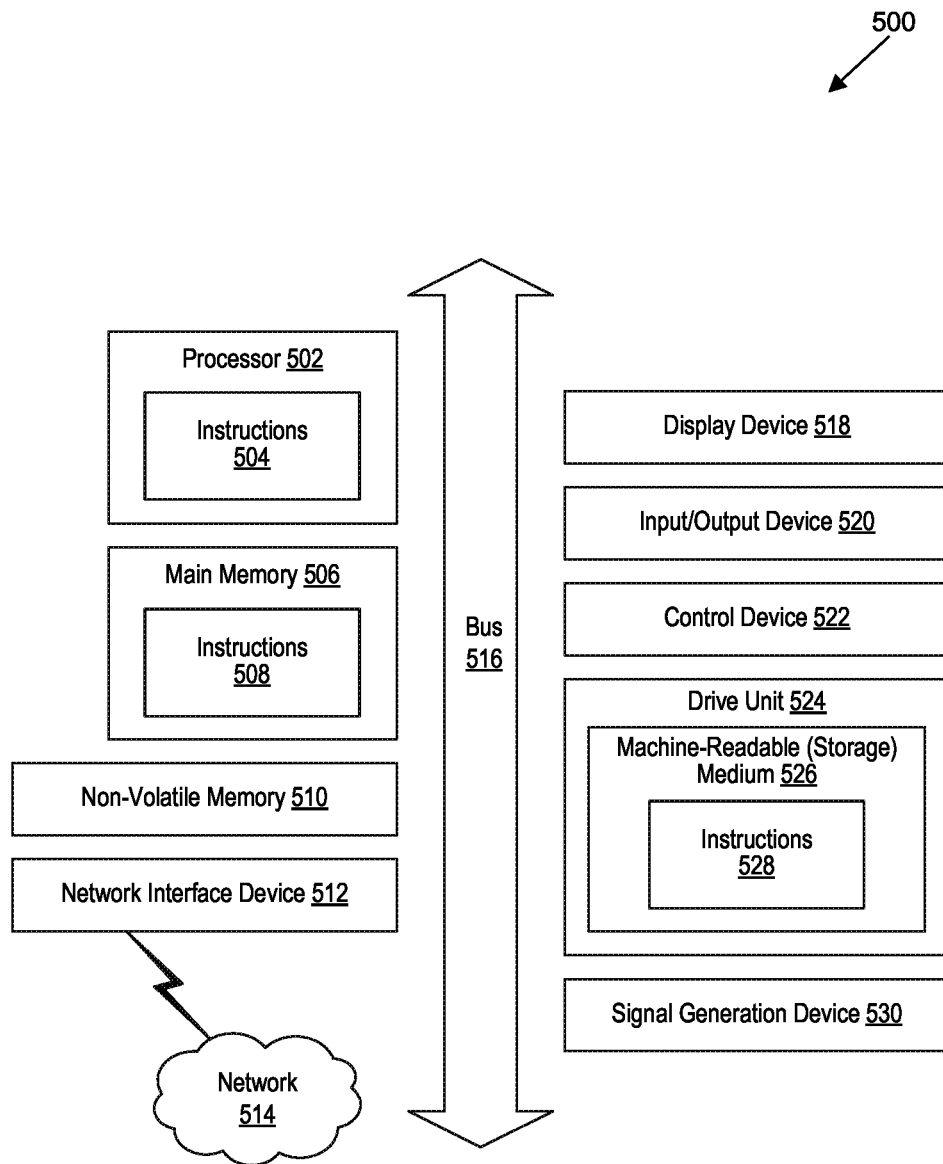
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a video display device 518, an input/output device 520, a control device 522 (e.g., keyboard and pointing device), a drive unit 524 that includes a machine-readable (storage) medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, in near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. A system comprising:
   at least one hardware processor; and
   at least one non-transitory memory storing instructions, which, when executed by the at least one hardware processor, cause the system to:
   capture a snapshot image of a dashboard including one or more visualizations,
      wherein the dashboard is configured to generate the one or more visualizations in real time based on metric data obtained from one or more data sources;
   store the snapshot image of the dashboard at a cache memory device,
      wherein the cache memory device stores multiple snapshot images of the dashboard captured at different points in time;
   cause display, at a display device, of the snapshot image of the dashboard and an accompanying quick response (QR) code,
      wherein the QR code embeds a link to the dashboard within the snapshot image, and
         wherein capturing an image of the QR code with a QR code reader presents the link to access the dashboard;
   aggregate data indicating patterns of utilization of different QR codes of different snapshot images to access the dashboard;
   generate a schedule based on the aggregate data to capture snapshot images of the dashboard at particular points in time; and
   capture snapshot images of the dashboard in accordance with the schedule,
      wherein the captured snapshot images are stored at the cache memory device.

2. The system of claim 1, further comprising:
   a web server coupled to the cache memory device and configured to:
      enable access to the different snapshot images of the dashboard for display via an internet browser on the display device; and
      enable a live connection to the dashboard via links embedded in the different QR codes for the different snapshot images.

3. The system of claim 1, further caused to:
   generate the accompanying QR code subsequently to capturing the snapshot image,
      wherein the accompanying QR code comprises a unique identifier for the snapshot image.

4. The system of claim 1, further caused to:
   determine a location on the image of the snapshot to overlay the QR code based on the one or more visualizations,
      wherein the location comprises a point on or outside of the image of the snapshot.

5. The system of claim 1, wherein to generate the schedule based on the aggregate data to capture snapshot images of the dashboard at particular points in time comprises causing the system to:
   schedule one or more predetermined time periods for capturing the snapshot images.

6. The system of claim 1, wherein to generate the schedule based on the aggregate data to capture snapshot images of the dashboard at particular points in time comprises causing the system to:
   schedule one or more predetermined times of day for capturing the snapshot images.

7. A non-transitory, computer-readable storage medium comprising instructions recorded thereon, wherein the instructions, when executed by at least one data processor of a system, cause the system to:
   capture multiple static snapshots of different data streams,
      wherein the multiple static snapshots are captured by a software agent controlled using an application programming interface (API);
   generate a QR code embedding a URL that is unique for each of the multiple static snapshots,
      wherein the QR code, when scanned by a QR code reader of a user device, is configured to direct the user device to access a data stream captured to produce a static snapshot uniquely identified by the QR code;
   cause display, on a display device of a particular user device, of a particular static snapshot and a particular QR code for a particular data stream;
   receive user activity data indicating that the particular user device accessed the particular data stream via the particular QR code; and
   determine, based on the user activity data, a threshold time to capture a future static snapshot for the particular data stream.

8. The non-transitory, computer-readable storage medium of claim 7, wherein to determine the threshold time to capture the future static snapshot for the particular data stream comprises causing the system to:

input the user activity data to a machine learning model configured to estimate when to capture future static snapshots of data streams,
   wherein the machine learning model is trained based on user activity data of multiple user devices that accessed at least the particular data stream via different QR codes of different static snapshots.

9. The non-transitory, computer-readable storage medium of claim 7, wherein to determine the threshold time to capture the future static snapshot for the particular data stream comprises causing the system to:
   analyze the user activity data to generate an interest factor,
      wherein the interest factor includes a metric of interest for the particular static snapshot; and
   change the threshold time to update the particular static snapshot based on a value of the interest factor for the metric of interest,
      wherein decreasing the threshold time corresponds to updating the particular static snapshot more frequently.

10. The non-transitory, computer-readable storage medium of claim 7, wherein to determine the threshold time to capture the future static snapshot for the particular data stream comprises causing the system to:
   analyze the user activity data to generate a rate over time comprising a measure for a change in values over a time period,
      wherein the rate over time is set as a value threshold; and
   in response to detecting a new rate over time, capturing a new static snapshot wherein the new rate over time is not equivalent to the value threshold.

11. The non-transitory, computer-readable storage medium of claim 7, wherein the software agent further causes the system to:
   interact with a webpage to capture multiple static snapshots of different data streams;
   manipulate a document object model (DOM) to capture a webpage static snapshot; and
   store the webpage static snapshot in a database at a web server.

12. The non-transitory, computer-readable storage medium of claim 7, wherein causing display, on a display device of a particular user device, of a particular static snapshot and a particular QR code for a particular data stream further comprises causing the system to:
   validate the particular QR code by authenticating the particular user device and a user associated with the particular user device,
      wherein the user can access the particular static snapshot.

13. The non-transitory, computer-readable storage medium of claim 7, further causes the system to:
   determine a set of parameters including a timestamp, or a size of a snapshot.

14. The non-transitory, computer-readable storage medium of claim 13, further causes the system to in response to determining the multiple static snapshots do not meet the set of parameters, display an error message.

15. A method for presenting dashboard snapshots with quick response (QR) codes to access live dashboard data, the method comprising:
   capturing a snapshot image of a dashboard including one or more visualizations,
      wherein the dashboard is configured to generate the one or more visualizations in real time based on metric data obtained from one or more data sources;
   generating an accompanying QR code,
      wherein the accompanying QR code comprises an embedded URL to the dashboard within the snapshot image;
   transmitting a command to display, at a display device, the snapshot image of the dashboard and the accompanying QR code,
      wherein capturing an image of the QR code with a QR code reader presents the embedded URL to access the dashboard;
   generating a schedule based on aggregated data to capture snapshot images of the dashboard at particular points in time,
      wherein the aggregated data indicates patterns of utilization of different QR codes of different snapshot images to access the dashboard; and
   capturing snapshot images of the dashboard in accordance with the schedule.

16. The method of claim 15, further comprising:
   determining a set of parameters including timestamp or a file size of a snapshot; and
   in response to determining the snapshot image does not meet the set of parameters, displaying an error message.

17. The method of claim 15, further comprising:
   receiving user activity data indicating that a particular user device accessed a particular QR code; and
   determining, based on the user activity data, a threshold time to capture a future snapshot image for the particular QR code.

18. The method of claim 17, wherein determining, based on the user activity data, the threshold time to capture a future snapshot image for the particular QR code further comprises:
   analyzing the user activity data to generate a rate over time comprising a measure for a change in values over a time period,
      wherein the rate over time is set as a value threshold; and
   in response to detecting a new rate over time, capturing a new snapshot image for the particular QR code,
      wherein the new rate over time is not equivalent to the value threshold.

19. The method of claim 17, wherein determining, based on the user activity data, the threshold time to capture a future snapshot image for the particular QR code further comprises:
   analyzing the user activity data to generate an interest factor,
      wherein the interest factor includes a metric of interest for the snapshot image; and
   changing the threshold time to update the snapshot image based on a value of the interest factor for the metric of interest,
      wherein decreasing the threshold time corresponds to updating the snapshot image more frequently for the particular QR code.

20. The method of claim 17, wherein determining, based on the user activity data, the threshold time to capture a future snapshot image for the particular QR code further comprises:
   inputting the user activity data to a machine learning model configured to estimate
      when to capture future snapshot image, wherein the machine learning model is trained based on user activity data of multiple user devices that accessed the particular QR code.

* * * * *